Dec. 19, 1961 C. B. SAWYER 3,013,867
PRODUCTION OF ARTIFICIAL CRYSTALS
Filed March 27, 1959 4 Sheets-Sheet 1
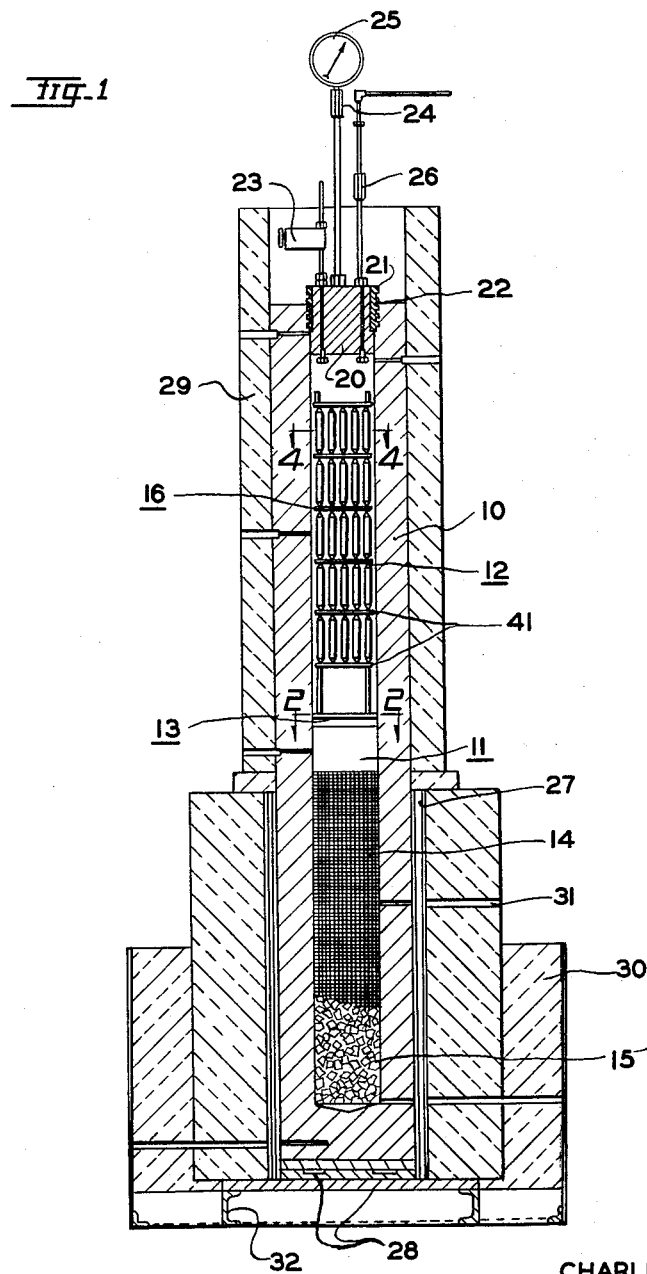
INVENTOR.
CHARLES B. SAWYER
BY
Oberlin, Maky, & Donnelly
ATTORNEYS Dec. 19, 1961 C. B. SAWYER 3,013,867
PRODUCTION OF ARTIFICIAL CRYSTALS
Filed March 27, 1959 4 Sheets-Sheet 2
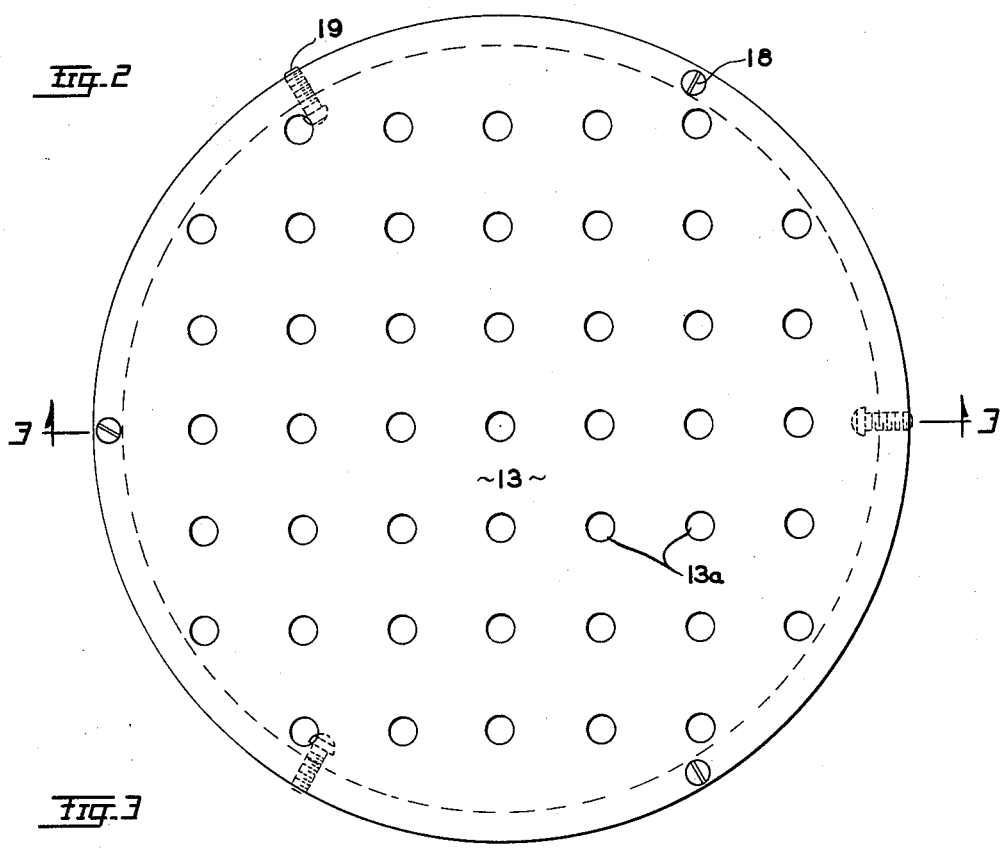
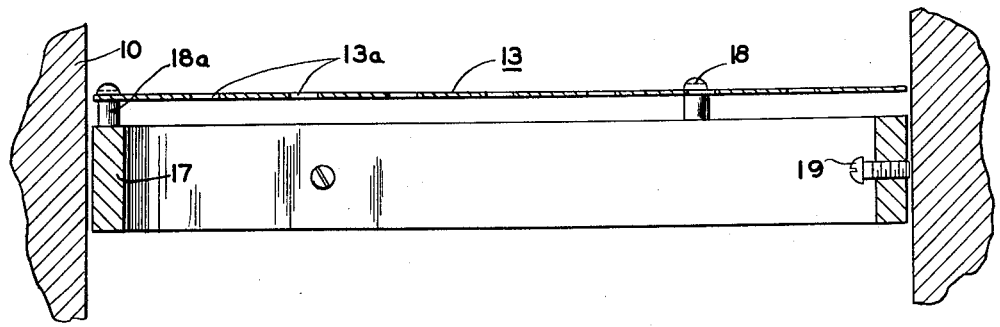
INVENTOR.
CHARLES B. SAWYER
BY
Oberlin, Maky, & Donnelly
ATTORNEYS Dec. 19, 1961 C. B. SAWYER 3,013,867
PRODUCTION OF ARTIFICIAL CRYSTALS
Filed March 27, 1959 4 Sheets-Sheet 3
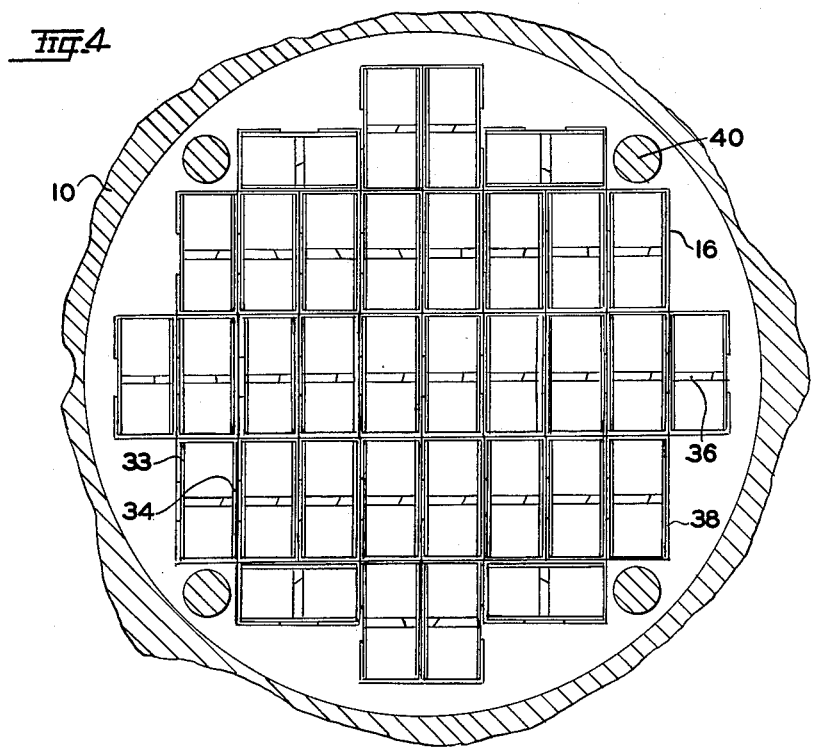
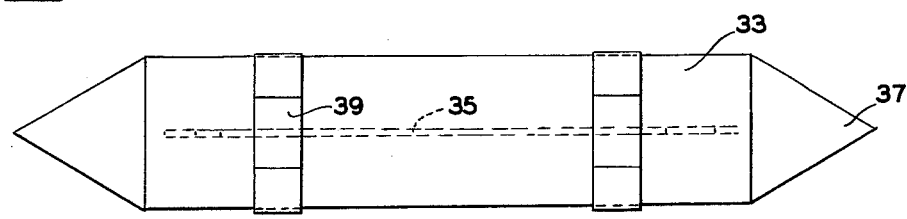
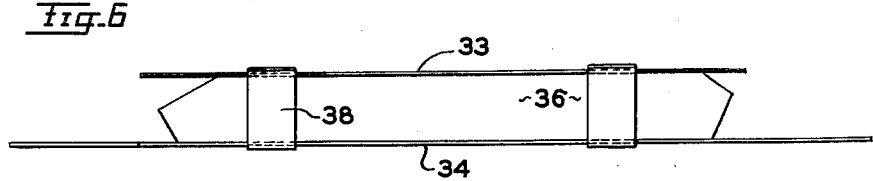
INVENTOR.
CHARLES B. SAWYER
BY
Oberlin, Maky, & Donnelly
ATTORNEYS Dec. 19, 1961    C. B. SAWYER    3,013,867
PRODUCTION OF ARTIFICIAL CRYSTALS
Filed March 27, 1959    4 Sheets-Sheet 4

INVENTOR.
CHARLES B. SAWYER
BY
Oberlin, Maky, & Donnelly
ATTORNEYS

United States Patent Office 3,013,867
Patented Dec. 19, 1961

3,013,867
PRODUCTION OF ARTIFICIAL CRYSTALS
Charles B. Sawyer, Cleveland Heights, Ohio, assignor to Sawyer Research Products, Inc., Eastlake, Ohio, a corporation of Ohio
Filed Mar. 27, 1959, Ser. No. 802,504
13 Claims. (Cl. 23—301)

The present invention relates to the production of artificial crystals and, more particularly, to a method and apparatus for improving the growth of pegmatitic crystals of high quality.

The present method and apparatus are adapted for artificially producing various crystals, usually oxides, such as beryllium oxide and aluminum oxide. However, the invention is particularly adapted for the production of pegmatitic crystals, notably quartz crystals, and therefore for convenience of disclosure will be described in connection with such crystals. Quartz crystals are becoming increasingly important commercially not only for optical purposes but because they possess the peculiarity of generating an electric potential when subjected to mechanical stress and, conversely, exerting a mechanical stress when subjected to an electric potential.

In the usual manner of artificially growing quartz crystals, a nutrient solution bathes a seed crystal either by mechanically induced means and/or by thermally induced means. The nutrient solution may comprise an aqueous alkaline solution of a siliceous material, such as pure natural quartz, and nurtures the growth of the seed by gradual deposition of the siliceous material on the seed crystal. In the usual operation, the bathing of a seed crystal by the nutrient solution takes place at rather high pressures such as 8,000 p.s.i. and at elevated temperatures such as 350° C. It is accordingly necessary to confine the seeds and mother solution in an airtight autoclave or bomb during crystal growth.

Ordinarily, the nutrient solution floods over the seed crystal in repetitious waves, as by the rocking arrangement in Sobek et al. United States Patent No. 2,675,303; or the nutrient solution is allowed to bathe a seed or seeds wholly by thermal currents in an unimpeded manner as in Buehler United States Patent No. 2,785,058. By still another technique, a nutrient solution has been actually projected from a source onto a seed crystal as through a funnel-shaped transfer medium.

The rate of crystal growth under the best known operating conditions is agonizingly slow. Moreover, the growing process is most sensitive and susceptible to many factors. For instance, crystals are often found to have "blue haze" which is faint blue milkiness visible only under intense illumination and also known as the Tyndall effect. "Blue haze" is caused by scattered microscopic inclusions of roughly two microns in diameter, judging by their Tyndall scattering pattern. These inclusions are not otherwise identified but are suspected to be inclusions of liquid. A further defect often found in such crystals is crevicing. Crevices are defects resembling small cracks in appearance and are thought to be caused by local failures of growth producing small, narrow voids. Attempts to accelerate crystal growth as by raising the operating temperature or by increasing the molarity of the siliceous material in the nutrient solution seem to make such defects more pronounced.

In addition to the foregoing, there are still other problems affecting crystal growth on a commercial scale wherein a large family of crystals may be simultaneously grown. For example, as the limiting rate of growth for high quality crystals is approached, crystal growth becomes so susceptible to even slight changes in operating conditions that it is difficult to obtain reproducible results in consecutive runs. Consequently, under commercial conditions the results from run to run contain a degree of uncertainty and some wastage almost inevitably results. Further, within a single run, the crystals do not grow uniformly so that even though some crystals are below size expectations, the run must be stopped to avoid the larger crystals from growing still larger and welding or growing into an adjoining crystal.

I have now developed a method and apparatus for growing crystals and especially quartz crystals which are of high quality and free to a remarkable extent of the defects mentioned. In the present invention I preferably employ a vertical autoclave having a tandem two chamber construction, one chamber being used for the dissolution of the feed material and the other chamber being used for the bathing and growth of the seed crystals. Instead of rather indiscriminately flowing or projecting the nutrient solution from the first chamber to the second, I provide each chamber with its own independent circulation which is not dynamically coupled to the other while simultaneously providing a diffused controlled infiltration of the nutrient solution therebetween. There results by means of this technique a controlled exchange between the two regions. This provides better mixing and more nearly constant conditions without interfering with the inertia of the natural thermal currents established in each region.

It is, therefore, a principal object of the present invention to provide an improved method and apparatus for producing artificial crystals.

Another object is to provide such a method and apparatus for growing pegmatitic crystals of high quality.

A further object is to provide such a method and apparatus for growing all the pegmatitic crystals of a family or batch of such crystals at a substantially uniform rate.

A still further object is to provide a method and apparatus for growing quartz crystals that are substantially free of the Tyndall effect, crevicing, and other defects.

Other objects will become apparent as the description proceeds.

To the accomplishment of the foregoing and related ends, the invention consists of the features hereinafter fully described and particularly pointed out in the claims, the annexed drawing and following disclosure describing in detail the invention, such drawing and disclosure illustrating, however, but one or more of the various ways in which the invention may be practiced.

In said annexed drawing:

FIGURE 1 is a vertical section of an autoclave embodying the present invention and shows a full complement of grown crystals;

FIGURE 2 is a section of FIGURE 1 on the line 2—2 and illustrates an apertured or perforated plate of the present invention;

FIGURE 3 is a section of FIGURE 2 on the line 3—3;

FIGURE 4 is a section of FIGURE 1 on the line 4—4 and shows the rack of the autoclave of FIGURE 1 when loaded with seed holders and seeds but before any crystal growth has taken place;

FIGURES 5 and 6 are plane and side views, respectively, of a seed holder and seed crystal which may be mounted in the rack of FIGURE 4.

Figure 7:
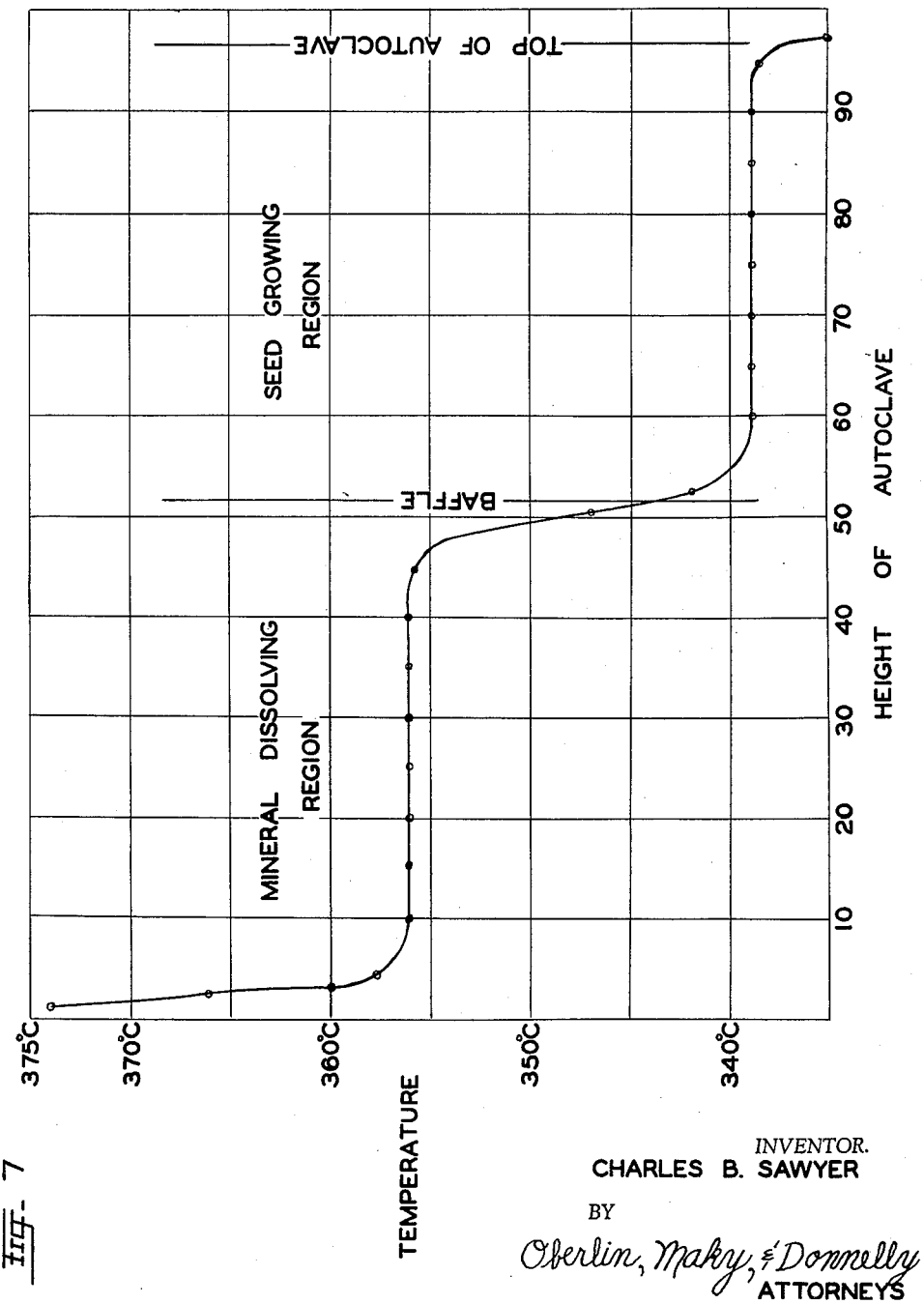
FIGURE 7 is a graph representing the temperature profile from a bottom to a top of an autoclave which is operated in accordance with the present invention.

In carrying out this invention, I provide a mineral supply or a mineral-dissolving region and a seed-growing region, each of such regions containing a solution adapted for circulation therein substantially independently of the liquid circulated in the other region. Simultaneously, there is a controlled unchannelized infiltrating exchange of the solution from one region to the other. This exchange is actuated and controlled by means effecting a temperature differential between such regions, as hereinafter more fully described.

Preferably, the two regions are vertically superposed in tandem fashion, so as to aid in the exchange of the stronger and weaker solutions between the described regions by hydro-thermal currents. By a "strong solution" is meant that nutrient liquid which effects the transfer of the siliceous material, in the case of quartz crystals and the described vertical arrangement, from the lower region to the upper region by dissolving the material in the mineral-dissolving region and then depositing such material on the seed crystals in the seed-growing region. In contrast, the "weak solution" moves from the upper region to the lower region. Preferably also, the temperature in each region is substantially constant throughout the bath of liquid circulation therein. However, there is a rather sharp temperature drop between such regions, the lower temperature being in the seed-growing region. This condition not only provides the thermal potential which forces the infiltration of the solution of the mineral-dissolving region into the seed-growing region and vice versa, but it causes the solution to become supersaturated within the latter region so that deposition of the solute is readily accomplished.

One means of effecting the unchannelized exchange of nutrient solution between the two described regions is by use of a separating member which defines on opposite sides thereof the mineral-dissolving region and the seed-growing region. In practice, I use a metal plate having a plurality of openings or apertures through which the nutrient solutions infiltrate in opposite directions. It will be understood that the paths of flow of the hydrothermal currents may vary in force and direction from time to time and also experience momentary fluctuations. However, the general direction of movement for the "strong solution" is thought to be primarily upwardly in the mineral-dissolving region along the walls of the autoclave (which are receiving heat energy), across the metal plate laterally of the autoclave while some of the solution simultaneously infiltrates into the seed-growing region through openings in the plate, and then downwardly of the mineral-dissolving region substantially centrally thereof. The direction of movement of the "weak solution" is thought to be downwardly into the seed-growing region along the walls of the autoclave (which are radiating heat energy), across the metal plate laterally of the autoclave while some of the solution simultaneously infiltrates into the mineral-dissolving region through openings in the plate, and then upwardly of the seed-growing region substantially centrally thereof. Of course, the solution which infiltrates a given region from a companion region tends to join the general current flow of that region.

In order to achieve the infiltrating exchange of solution from region to region, I have found that the number and/or size of the openings in the separating member is important. If the sum of the openings is too large, the situation approaches that in which there is no plate; and the two regions have fairly free unlimited interchange such that they lose their identity as herein defined with loss of their separate dynamic movements. Also too rapid an interchange of the nutrient solution may result in too high a supersaturation with nucleation of unwanted crystals. Further, under these conditions of free interchange, the differential temperature between a mineral-dissolving region and a seed-growing region may decrease uncontrollably. On the other hand, if there are too few openings or the openings are too small, the two regions become choked off from each other, and the amounts of both heat and solute carried by the hydrothermal solution into the seed-growing region seriously decrease.

I have found that crystals of satisfactory quality are produced within an acceptable period of time when the combined openings or apertures in the separating plate between the two defined regions constitute from about 2.5 to about 25 percent of the area through which the nutrient solution diffuses. Preferably, the combined openings should constitute about 2.5 percent to about 15 percent to produce crystals under better control. In practice, this area will normally be the horizontal section of an autoclave as hereinafter described in connection with FIGURE 1. The openings or apertures in a plate of the present invention may be of any configuration and need not follow a uniform pattern over a plate although normally this is followed. Likewise, the openings in a given plate need not all be of the same configuration. Further, since autoclaves are usually of a circular cross-section to withstand the high pressures involved, an exchange plate of the present invention cannot fit absolutely tightly against the walls of an autoclave, as sufficient clearance must be provided for insertion and withdrawal from the autoclave. Any annular area thus resulting is included in the cited percentage ranges of open area between the two regions.

Another means of considering the nature of the operation of the exchange plate or baffle (although not necessarily exclusively), is by way of controlling the amount of temperature drop in passing from the mineral-dissolving region to the seed-growing region. Usually, only the mineral-dissolving region is heated as hereinafter noted. As the size and/or number of openings in a baffle plate are enlarged, there is less temperature drop due to the plate, and the two sections have freer interchange of solution. If the size and/or number of openings are too small, the temperature drop may become excessive provided there is not compensating change in the heat loss from the upper chamber. Although crystal growth increases through "faster" hydrothermal currents, for reasons not fully understood, an extensive temperature drop frequently renders the previously described crystal defects more pronounced, including crevicing. In general, I have found that the temperature drop between the supply or mineral-dissolving region and the seed-growing region should ordinarily be within the range of about 4° C. to about 19° C. This temperature range is particularly useful when an aqueous solution of sodium carbonate forms the solution for the quartz. However, other solutions may be used such as an aqueous solution of sodium hydroxide, and in such cases it may be desirable to operate with a higher temperature drop between the regions.

The exchange or infiltration plate of the present invention also has the effect of rendering the temperature of the nutrient solution substantially constant in each region. For example, the mineral-dissolving region may have a temperature within the range of about 355° C. to about 375° C. and preferably about 364° C. to about 366° C.; and the seed-growing region may have a temperature within the range of about 335° C. to about 370° C. and preferably about 352° C. to about 355° C. Of course, in a given situation, the temperature of the seed-growing region is always below that of the mineral-dissolving region. This result of a substantially uniform solution temperature throughout each region is particularly important in the seed-growing region, because a substantially uniform temperature throughout such region coupled with uniform supersaturation means uniform deposition of the solute and therefore uniform crystal growth. Similarly, the growth rate is most nearly related to the amount of supersaturation of the nutrient solution. If the supersaturation is maintained substantially constant over the surfaces of the growing crystals, the growth rate will be substantially constant, since the concentration of the nutrient solution is actually substantially constant from top to bottom within each region by means of the present invention.

Referring to the drawing and particularly to FIGURE 1 thereof, an autoclave in which the present apparatus and method may be used includes a vertical tubular chamber 10 closed at the bottom and divided into a supply or mineral-dissolving region generally indicated at 11 and a seed-growing region generally represented at 12 by an exchange plate 13 located centrally of the chamber 10. This chamber may be fabricated from steel of high creep strength, such as steel containing 2.25 percent chromium and 1 percent molybdenum. Within the mineral-dissolving region 11 lies a wire mesh feed basket 14 containing crystalline quartz 15 which is to be dissolved to form a nutrient solution and to be carried to the seed-growing region 12. The quartz may be, for example, Lascas grade natural quartz. A rack 16 supporting a plurality of seed crystals is stationed in the latter region.

The exchange or infiltration plate 13 has a plurality of openings or apertures 13a and is fixed to a support ring 17 by screws 18 which pass through intervening spacers 18a. Set screws 19 engage threaded openings in the ring 17 and bear against the sides of the wall of the chamber 10 to hold the plate assembly in position. As previously noted, the openings 13a may be of variable size or number or configuration as long as they are distributed substantially over the plate and the total open area falls within the range previously designated. In one particular installation for a pilot plant autoclave having an internal diameter of eight inches, a circular infiltration plate also eight inches in diameter of sixteen gauge low carbon steel was used. This plate had 45 holes uniformly distributed over its surface area. Thes holes were of the same diameter and comprised in total about 7.5 percent of the surface area of the plate.

A plug 20 tightly seals the upper end of the chamber 10 and has a wear-resistant collar 21 fixed to the plug 20 and threadably meshing with a threaded upper terminus of the chamber. Narrow passages 22 extend through the plug 20 to expose suitable equipment to conditions extant within the interior of the chamber 10. Such equipment may include, for example, a bleeder valve 23, a surge check valve 24, a pressure gauge 25, a rupture disk 26, and other desired testing and control equipment.

Side and bottom strip heaters 27 and 28, respectively, are conventionally secured to the lower portion or mineral-dissolving region 11 of the chamber. These strip heaters are electrically energized as through potentiometer-type controllers operating in conjunction with a variable type transformer. In one installation, the vertical strip heaters 27 were strapped about the bottom third of the autoclave. These heaters were 28 in number, 42½ inches long, and were rated at 1500 watts. The heaters were manufactured by the Edward L. Wiegand Co. of Pittsburgh, Pennsylvania, and bore Wiegand-type number SE-4301. These 28 strip heaters were divided into three nearly equal banks which could be connected either in delta for rapid heating or in the Y three phase connection for operation in an on-off temperature control. In the same installation, the bottom heaters 28 included two concentric circular heaters, one rated at 1050 watts (Wiegand-type number A-80) and one rated at 1500 watts (Wiegand-type number A-90). These heaters were operated continuously through a variable transformer which was adjusted to provide the desired bottom temperature.

Suitable high temperature insulation 29 encompasses the length of the chamber 10 and may comprise, for instance, magnesium oxide block insulation. Additional insulation 30 such as expanded mica (vermiculite) embraces the lower end in order economically to effect in combination with the strip heaters 27 and 28 a higher temperature at the end of the chamber 10 and thereby induce thermal currents in the nutrient solution which travel upwardly and longitudinally of the chamber toward the seed-growing region 12. It is advisable to minimize the effect of room temperature variations on the flow of heat leaving the autoclave which, of course, effects conditions extant within the autoclave, particularly the temperature differential between the defined regions. In practice, I provide insulation around the seed-growing region that can be varied according to need. For this purpose, asbestos sheets to which aluminum foil is cemented on one side are well suited. Under different running conditions, in which the baffle plates may have different percentages of open area and there may be different temperature differentials between the mineral-dissolving and seed-growing regions, the number of sheets wrapped around tthe upper or seed end of the autoclave may range between 2 and 18. These sheets of insulation were allowed to extend as much as six inches above the top of the autoclave so that if desired the resulting cavity above the top could be filled with mineral fibers or like insulation in order also to insulate the top of the autoclave.

A series of thermocouple wells 31 spaced vertically along the autoclave penetrate to desired areas of the chamber 10 and receive standard pencil thermocouples to indicate the temperatures at such areas in a known manner. Beams or channels 32 support the entire autoclave structure.

A seed holder (FIGURES 5 and 6) which may be used comprises a pair of substantially parallel plates 33 and 34 adapted frictionally to engage the opposing minor surfaces 35 of a seed crystal 36. One of the plates 33 or 34 extends past each end of the seed crystal 36 and terminates in a narrower portion transversely of the plate which in the embodiment shown is a pointed triangular end 37. This structure facilitates mounting the seed holders in a seed rack as hereinafter described. The plates 33 and 34 may be made of iron or low carbon alloys of iron, although other materials such as silver, titanium, and even graphite have been used.

Tension means secure the plates 33 and 34 in relation to the seed crystal 36 and may take the form of one or more extensible metal bands 38 which snugly embrace the exterior of the plates 33 and 34 to clamp them in a desired frictional engagement with the minor faces 35 or edges of the seed crystal 36. In order to impart a resilient tension to the assembled seed holder, one or more of the bands 38 may be offset as at 39 so that the band is somewhat stretched in tension upon being fitted about the plates and crystal.

A family of such seed holders as shown in FIGURES 5 and 6 is simultaneously planted in the seed-growing region 12 of the chamber 10, and for this purpose the rack 16 of FIGURE 4 is used. The rack includes four corner steel posts 40, the lower ends of which may rest on the rim of the infiltration plate or baffle 13, to which vertically spaced plates 41 are suitably secured. The plates 41, which may form as many tiers as permitted by the size of the chamber 10 and the length of the seed holders, support the triangular ends 37 of the seed holder, or the ends of the seed crystals may be similarly directly supported. In order to provide for the circulation of a nutrient solution around and between the seed holders, each plate 41 comprises spaced-apart bars or slats (not shown), and each slat has chamfers or recesses which are vertically aligned with other chamfers on the facing side of another slat of an adjacent plate 41. Such chamfers thus readily receive the pointed ends 37 of a seed holder to position the seed crystals 36 vertically of the chamber 10. The bars or slats of each plate 41 are arranged to support the holders so as to dispose them in a substantially circular cross-sectional pattern since the chamber 10 likewise is of circular cross-section. The tension bands 38 of FIGURES 5 and 6, are U-shaped, the legs thereof being normally disposed somewhat inwardly. Accordingly, upon being slipped over the plates 33 and 34, the bands 38 are tensioned to hold the plates and seed crystal 36 in assembly.

It will be apparent that the use of the present method and apparatus is not critical to any particular set of operating conditions. However, the following data are submitted as exemplary of one autoclave and operating conditions therefor which may be used in carrying out the invention.

| | |
|---|---|
| Inside diameter | 8 inches. |
| Volume | 79 liters. |
| Design pressure | 10,000 p.s.i. |
| Design temperature | 450° C. |
| Steel | Croloy 2¼. |
| Closure | Modified Bridgeman. |
| Manuacturing method | Bored. |
| Inside height | 8 feet. |
| Outside height | 106⅝ inches. |
| Outside diameter | 14 inches. |

"Croloy" is a trade name for steel-containing chromium. By "Modified Bridgeman" is meant that conventional high pressure seal known in the art.

The operating conditions of a typical run for an autoclave of the type just described are:

| | |
|---|---|
| Solution | 0.5 to 0.83 molar sodium carbonate in water. |
| Degree of initial filling | 80%. |
| Operating temperature of seed-growing region | 350° C. |
| Operating temperature of mineral-dissolving region | 365° C. |
| Pressure | 10,000 p.s.i. |
| Number of seeds | 180 to 200 (depending on lengths). |
| Length of run (including clean out and restart) | 40 to 45 days. |
| Percent of open area of exchange plate | 7.5%. |
| Heat input | 4 kilowatts. |
| Quartz transport | Average 2 pounds per day. |

A normal procedure is to load the autoclave through the opening of the plug 20 and after sealing to commence heating the autoclave. When the temperature of the autoclave reaches about 150° C. as indicated by thermocouples, the air within the autoclave is bled through the bleeder valve 23. Heating is then continued through the heater strips 27 and 28 until a control point is reached which is normally about 365° C. for the mineral-dissolving region 11. Subsequently, the temperature is maintained at the control point as by standard automatic electrical equipment. At the operating elevated temperature and pressure, the aqueous sodium carbonate solution dissolves some of the quartz crystal material in the basket 14 of the mineral-dissolving region 11 thus approaching saturation. Due to the controlled temperature differential between the seed-growing region and the mineral-dissolving region, there are upward thermal currents of solution into the seed-growing region 12. Here the solution is cooled and becomes supersaturated with respect to the dissolved quartz crystals, again because of the difference in temperature, and deposits the quartz on the seed crystals.

The progress of the run is determined by gammagraphs. The use of gamma rays and the like is the only known practical tool by which the crystal size can be measured non-destructively during crystal growth. Preferably, measurements are obtained by taking a gammagraph shadow picture of an "alley" between two vertical rows of crystals growing in the autoclave much in the same manner as a standard conventional X-ray is made. As growth continues, the width of this "alley" becomes smaller. For the purpose of taking a gammagraph, a 5 curie point gamma ray source (of cobalt-60) is carefully arranged in relation to the seed rack 16 to project a beam between the adjacent vertical rows of seeds and impinge upon a plate which is then developed. The beam is of sufficient width to cast a shadow from such adjacent rows which partially block it. This provides a close and quite satisfactory control as to the size of the growing seeds. However, the utility of gamma rays is not limited to photography. It is possible to use a variety of other detection or scanning devices, such as a Geiger counter.

At the same time, since the supersaturation and temperature within the seed-growing region is substantially constant as illustrated by FIGURE 7, there is substantially uniform growth of all seed crystals. The temperature profile graph of FIGURE 7 is based on data observed from a pilot plant run of an autoclave having an internal height of 100 inches and an internal diameter of 9 inches. This diffusion plate used in this autoclave had openings constituting five percent of its surface area, and the operating pressure was 8,000 p.s.i. Temperature readings were taken by thermocouples along the length of the autoclave. The data show sharp temperature drops at the extreme ends of the autoclave as well as across the diffusion plate, but the temperature in each of the two regions is remarkably constant. A temperature drop of 12° C. occurred across the diffusion plate.

When the seeds are grown to the desired size, as indicated, for example, by gammagraph measurements, the power is turned off. The autoclave is permitted to cool and then may be opened for removal of the grown crystals.

Other forms embodying the features of the invention may be employed, change being made as regards the features herein disclosed, provided those stated by any of the following claims or the equivalent of such features be employed.

I therefore particularly point out and distinctly claim as my invention:

1. In the method of growing a pegmatitic crystal within a seed-growing region by a nutrient solution continuously exchanged between such region and a supply region through a common inter-connecting area; the steps of thermally inducing a circulation of such solution in each region through separate paths of movement substantially independently of the other, and simultaneously permitting such solution to infiltrate from one region to the other substantially throughout such area but spaced from the periphery thereof at a rate insufficient to affect such substantially independent circulation while completely preventing such infiltrating exchange adjoining the peripheries of such regions at such inter-connecting area.

2. In the method of growing a pegmatitic crystal within a seed-growing region by a nutrient solution continuously exchanged between such region and a supply region through a common inter-connecting area; the steps of heating the supply region to induce circulation of such solution therein, maintaining such seed-growing region at a temperature lower than the temperature of such supply region to provide a thermal potential tending to cause such solution to flow into the seed-growing region, and restricting such region to region flow to a portion of such inter-connecting area spaced inwardly thereof and from the peripheries of such regions at such common inter-connecting area while providing an exchange flow between such regions at a rate insufficient to affect substantially such solution circulation.

3. In the method of growing a quartz crystal within a seed-growing region disposed above a mineral-dissolving region to receive therefrom a nutrient solution through an intervening horizontally-disposed area; the steps of heating the mineral-dissolving region to induce circulation of such solution therein, maintaining such seed-growing region at a temperature lower than the temperature of the mineral-dissolving region to provide a thermal potential tending to cause such solution to flow upwardly into the seed-growing region, circulating such solution in the seed-growing region independently of such circulation in the mineral-dissolving region, simultaneously permitting the solution of one region to infiltrate the other region substantially uniformly across such horizontally-disposed area while preventing flow between such regions adjoining their peripheries at such intervening area, and controlling the temperature drop from the mineral-dissolving region to the seed-growing region by the amount of such infiltration.

4. In the method of growing a quartz crystal within a seed-growing region disposed above a mineral-dissolving region to receive therefrom a nutrient solution throughout an intervening horizontally-disposed area, such regions having a common periphery at such area; the steps of heating the mineral-dissolving region to induce circulation of such solution therein, maintaining the temperature in the mineral-dissolving region substantially uniformly throughout such region, maintaining the temperature in the seed-growing region substantially uniformly throughout such region also but at a temperature lower than the temperature of the mineral-dissolving region to provide a thermal potential tending to cause such solution to flow upwardly by convection into the seed-growing region, circulating such solution in the seed-growing region independently of such circulation in the mineral-dissolving region, and simultaneously interexchanging such solution from region to region in a diffused flow across such horizontally disposed area and at a rate insufficient to affect substantially such independent circulation of each region while simultaneously preventing vertical peripheral exchange between such regions at such common periphery.

5. In the method of growing a quartz crystal in a vertical autoclave having a seed-growing region disposed over a mineral-dissolving region to receive therefrom a nutrient solution throughout an intervening horizontally-disposed area; the steps of heating the mineral-dissolving region adjacent a lower end thereof to induce vertical circulation of such solution therein, maintaining such seed-growing region at a temperature lower than the temperature of such mineral-dissolving region to provide a thermal potential tending to flow such solution by convection vertically upwardly into the seed-growing region, thermally inducing substantially vertical currents in the seed-growing region to circulate such solution therein independently of and dynamically uncoupled with such circulation in the mineral-dissolving region, and simultaneously infiltrating the solution of one region into the other in a diffused flow across such horizontally-disposed area while simultaneously preventing peripheral flow between such regions adjoining the walls of the autoclave to avoid substantial loss of kinetic energy and to provide a temperature drop between such regions within the range of about 4° C. to about 19° C.

6. In the method of growing a quartz crystal in a vertical autoclave having a seed-growing region aligned vertically over and having a common periphery with mineral-dissolving region to receive therefrom a nutrient solution throughout an intervening horizontally-disposed area; the steps of heating the mineral-dissolving region adjacent a lower end thereof to induce vertical circulation of such solution therein, maintaining the temperature in the mineral-dissolving region substantially uniformly throughout such region within the range of about 355° C. to about 375° C., maintaining the temperature in the seed-growing region substantially uniformly throughout such region also but at a lower temperature within the range of about 335° C. to about 370° C. to provide a thermal potential tending to flow such solution by convection upwardly into the seed-growing region, circulating such solution in the seed-growing region independently of such circulation in the mineral-dissolving region, and simultaneously interexchanging such solution from region to region in a diffused infiltrating flow across such horizontally-disposed area and at a rate insufficient to affect substantially such independent circulation within each region while simultaneously preventing peripheral flow between such regions adjacent the walls of the autoclave at such common periphery to avoid direct and opposed meeting of such independent circulations.

7. In apparatus for growing a pegmatitic crystal wherein a nutrient solution is continuously exchanged between a seed-growing chamber and an aligned supply chamber adapted to communicate with each other; means for thermally circulating said solution in each of said chambers independently of the other, and an exchange plate disposed between said chambers having means to prevent peripheral flow between said chambers while permitting such solution to infiltrate from one chamber to the other uniformly across said plate and within the periphery thereof at a rate insufficient to affect substantially such independent circulation in said chambers.

8. In apparatus for growing a quartz crystal wherein a nutrient solution is continuously exchanged between a seed-growing chamber and a mineral-dissolving chamber adapted to communicate with each other; means to heat the mineral-dissolving chamber to circulate said solution therein, means to circulate said solution in the seed-growing chamber independently of the circulation in the mineral-dissolving chamber, and a multi-apertured plate disposed between the chambers and having means to prevent peripheral exchange between said chambers and restrict the flow of said solution from chamber to chamber to a rate insufficient to affect substantially such solution circulations, the apertures of said plate being spaced within the periphery of the plate and from each other.

9. The apparatus of claim 8 wherein said plate has apertures connecting said two chambers which constitute about 2.5 percent to about 25 percent of the cross-sectional area through which said chambers communicate.

10. Apparatus for growing a quartz crystal including a substantially vertical autoclave, a plate having a plurality of spaced-apart apertures within the autoclave dividing it into a lower mineral-dissolving chamber each chamber being adapted to receive and an upper seed-growing chamber, each chamber being adapted to receive a nutrient solution, means to heat the mineral-dissolving chamber to induce circulation of said solution therein, said plate substantially confining such circulation to said mineral-dissolving region, means to maintain said seed-growing chamber at a temperature lower than the temperature of said mineral-dissolving chamber to provide a thermal potential tending to cause such solution to flow by convection through the apertures of said plate and into the seed-growing chamber, the apertures of said plate being spaced inwardly from the edge of said plate to prevent peripheral flow between the chambers and uniformly distributed across the plate to permit only a diffused infiltration of such solution from one chamber into the other.

11. Apparatus for growing a quartz crystal including a substantially vertical autoclave, a plate having a plurality of spaced-apart apertures substantially horizontally disposed within the autoclave dividing it into a lower mineral-dissolving chamber and a substantially aligned upper seed-growing chamber, each chamber being adapted to receive a nutrient solution, means adjacent a lower end of the mineral-dissolving chamber to heat the same and induce vertical circulation of said solution therein, said plate substantially confining such circulation to said mineral-dissolving chamber and providing a substantially uniform temperature vertically of said chamber, and means to maintain said seed-growing chamber at a substantially uniform temperature vertically thereof but at a lower temperature than the temperature of said mineral-dissolving chamber to provide a thermal potential tending to cause such solution to flow by convection through the apertures of said plate and into the seed-growing chamber, the apertures of said plate being uniformly distributed thereacross and spaced inwardly from the edge of the plate to prevent peripheral flow of the solution between the chambers and further being of sufficient size and number to provide a diffused exchange over the surface of said plate without substantial loss of kinetic energy in the solution flow.

12. Apparatus for growing a family of quartz crystals substantially free of the Tyndall effect and crevicing including in combination: a vertical autoclave, an exchange plate substantially horizontally mounted within the autoclave and having a plurality of spaced-apart openings extending therethrough spaced from the edge of the plate to prevent peripheral flow thereacross and placed substantially uniformly over the face of the plate within the defined periphery, said plate dividing the autoclave into a lower mineral-dissolving chamber and an aligned upper seed-growing chamber, each chamber being adapted to receive a nutrient solution, means to heat the mineral-dissolving region adjacent a lower end thereof to a mineral-dissolving temperature and induce vertical circulation of said solution therein, said plate substantially confining such solution to said mineral-dissolving chamber to provide a substantially uniform temperature vertically of said chamber, insulating means disposed at least about said seed-growing chamber to control heat radiating therefrom and thereby thermally to induce vertical solution currents therein independently of the solution currents in said mineral-dissolving chamber, said insulating means providing a substantially uniform temperature vertically of said seed-growing chamber to provide a thermal potential tending to cause such solution to flow by convection without substantial loss of kinetic energy through the openings of said exchange plate and into the seed-growing chamber free of peripheral flow along the aligned chambers, said openings constituting about 2.5 percent to about 25 percent of the surface area of the face of the plate.

13. In the method of growing a quartz crystal in a vertical autoclave having a seed-growing region aligned vertically over a mineral-dissolving region to receive therefrom a nutrient solution through an intervening horizontally-disposed area; the steps of heating the mineral-dissolving region adjacent a lower end thereof to a temperature within the range of about 355° C. to about 375° C. to induce vertical circulation of such solution substantially upwardly along the walls thereof, radially inwardly of the mineral-dissolving region at such intervening area, and then substantially vertically downwardly at a central portion of such mineral-dissolving region; dissipating heat from the seed-growing region to maintain such region at a lower temperature within the range of about 335° C. to about 370° C. to induce vertical circulation of solution therein substantially downwardly along the walls thereof, radially inwardly of the seed-growing region at such intervening area, and then substantially vertically upwardly at a central portion of such seed-growing region; using the thermal potential between such two regions to draw the nutrient solution upwardly from the mineral-dissolving region to the seed-growing region while exchanging solution from the seed-growing region to the mineral-dissolving region; restricting the action of such exchange to a sufficiently slow rate across the horizontally-disposed area to infiltrate the solution of one region into the other region without substantially interfering with the independent circulation in each region and to maintain a temperature drop between such regions and across such intervening area to a temperature within the range of about 4° C. to about 19° C.; and simultaneously completely preventing peripheral exchange adjoining the walls of the autoclave at such intervening area by preventing the upward circulation of the solution along the walls of the mineral-dissolving region and the opposed downward circulation of the solution along the walls of the seed-growing region from meeting directly head-on to avoid substantial loss of kinetic energy.

References Cited in the file of this patent

UNITED STATES PATENTS

| | | |
|---|---|---|
| 2,675,303 | Sobek | Apr. 13, 1954 |
| 2,785,058 | Buehler | Mar. 12, 1957 |
| 2,895,812 | Kohman | July 21, 1959 |